United States Patent [19]

Daddis, Jr.

[11] Patent Number: 6,006,741
[45] Date of Patent: Dec. 28, 1999

[54] SECONDARY HEAT EXCHANGER FOR CONDENSING FURNACE

[75] Inventor: Eugene D. Daddis, Jr., Nedrow, N.Y.

[73] Assignee: Carrier Corporation, Farmington, Conn.

[21] Appl. No.: 09/144,604

[22] Filed: Aug. 31, 1998

[51] Int. Cl.[6] .................................................. F24H 3/02
[52] U.S. Cl. ................................ 126/110 R; 126/99 R; 165/134.1; 165/177; 29/890.053
[58] Field of Search ............................ 126/110 R, 99 R, 126/99 C, 109; 165/177, 170, 133, 134.1; 29/890.053

[56] References Cited

U.S. PATENT DOCUMENTS

| | | | |
|---|---|---|---|
| 1,954,638 | 4/1934 | Loeffler | 138/145 |
| 2,476,666 | 7/1949 | Keller | 165/177 |
| 2,845,284 | 7/1958 | Kallstrom | 29/890.053 |
| 4,570,700 | 2/1986 | Ohara et al. | 165/134.1 |
| 4,738,307 | 4/1988 | Bentley | 165/133 |
| 4,807,588 | 2/1989 | Bentley et al. | 126/110 R |
| 4,848,314 | 7/1989 | Bentley | 126/116 R |
| 4,982,785 | 1/1991 | Tomlinson | 165/170 |

*Primary Examiner*—James C. Yeung
*Attorney, Agent, or Firm*—Wall Marjama Bilinski & Burr

[57] ABSTRACT

A secondary heat exchanger suitable for use in a condensing furnace which is in the form of a bank of a plurality of metal tubes which are positioned in a plurality of stacked rows. The tubes are interconnected to form a continuous fluid flow path and have a uniform adherent corrosion resistant polymeric internal surface. The tubes further contain a longitudinal seam which is formed by crimping the edges of the tube together to provide for the compression of two polymer surfaces together thereby forming a seal capable of maintaining its integrity at conventional design pressures.

6 Claims, 4 Drawing Sheets

SECONDARY HEAT EXCHANGER FOR CONDENSING FURNACE

BACKGROUND OF THE INVENTION

This invention relates generally to gas-fired condensing furnaces, and more specifically to a corrosion resistant secondary or condensing heat exchanger which is both inexpensive and relatively easy to manufacture.

Current heat exchangers which are used in residential furnaces are expensive, highly tooled clamshell designs, and are not easily adapted to other furnaces. Flexible designs, such as those using tubing, require the use of stainless steels for corrosion protection and are also relatively expensive to manufacture. Attempts have been made to fabricate low cost corrosion-proof tubes by using polymer coatings or dipping techniques. These methods have been unsuccessful to date due to the difficulty in obtaining a "leak free" polymer coverage.

There is also a need for improvements to the headering and manifolding of the secondary heat exchanger. If "roll lock", or expansion joints could be made between the secondary heat exchanger and vestibule/primary heat exchanger a difficult gasketing and sealing process would be eliminated. In addition, existing heat exchanger design does not facilitate the use of fins (for increasing the air side heat transfer surface area). A tubing design which could provide the advantages described above, would provide a solution to some of the existing disadvantages associated with current clamshell designs.

SUMMARY OF THE INVENTION

It is an object of the present invention to provide a relatively inexpensive and corrosion resistant condensing heat exchanger of a simple tubular construction for a condensing furnace.

Another object of the present invention is to provide a method of manufacturing a corrosive resistant tube type condensing heat exchanger having a layer of corrosion resistant polymer sheet material over its entire internal surface.

A further object of the present invention is to provide a reliable economical condensing furnace.

A still further object of the present invention is to provide a secondary heat exchanger in the form of a metal rolled-formed tube bank which contains an internal polymer surface laminated thereto, which will not suffer coating damage during condensing heat exchanger fabrication or operation.

The novel aspect of the present invention relates to a secondary heat exchanger design in the form of a roll-formed tube bank. The tubing cross-section can be of any suitable shape such as circular, oval, square or rectangular. The tubes contain a layer of a corrosion resistant polymer material over their internal surface. The tubes are made by roll-forming a metal such as a low carbon steel laminated with a suitable polymer into a tube of the desired cross-section and size. The longitudinal seam of the formed tube is then sealed by crimping or welding. The compression of the polymer surfaces together forms a seal which is capable of maintaining its integrity at required design pressures.

The heat exchanger may be in the form of multiple rows forming a tube bank. The rows may be uniform or staggered depending upon the required use and design. For optimum heat transfer, the tubes may be dimpled, have external plate fins or use internal baffles. The headering of the tube ends can be done by expansion. In this process the tube ends are inserted into a header that has an extruded hole slightly larger than the tube diameter. The tube is then roll locked (or expanded) until it forms a compression fit with the header plate.

The tubular design of the present invention provides the further advantage of being able to adjust to any required size by simply cutting the tubes to the desired length. The tubes also can be easily bent to any angle to form single or multiple passes.

BRIEF DESCRIPTION OF THE DRAWING

For a fuller understanding of the nature and objects of the invention, reference should be made to the following detailed description of a preferred mode of practicing the invention, read in connection with the accompanying drawings, in which.

DETAILED DESCRIPTION OF THE INVENTION

Figure 1:
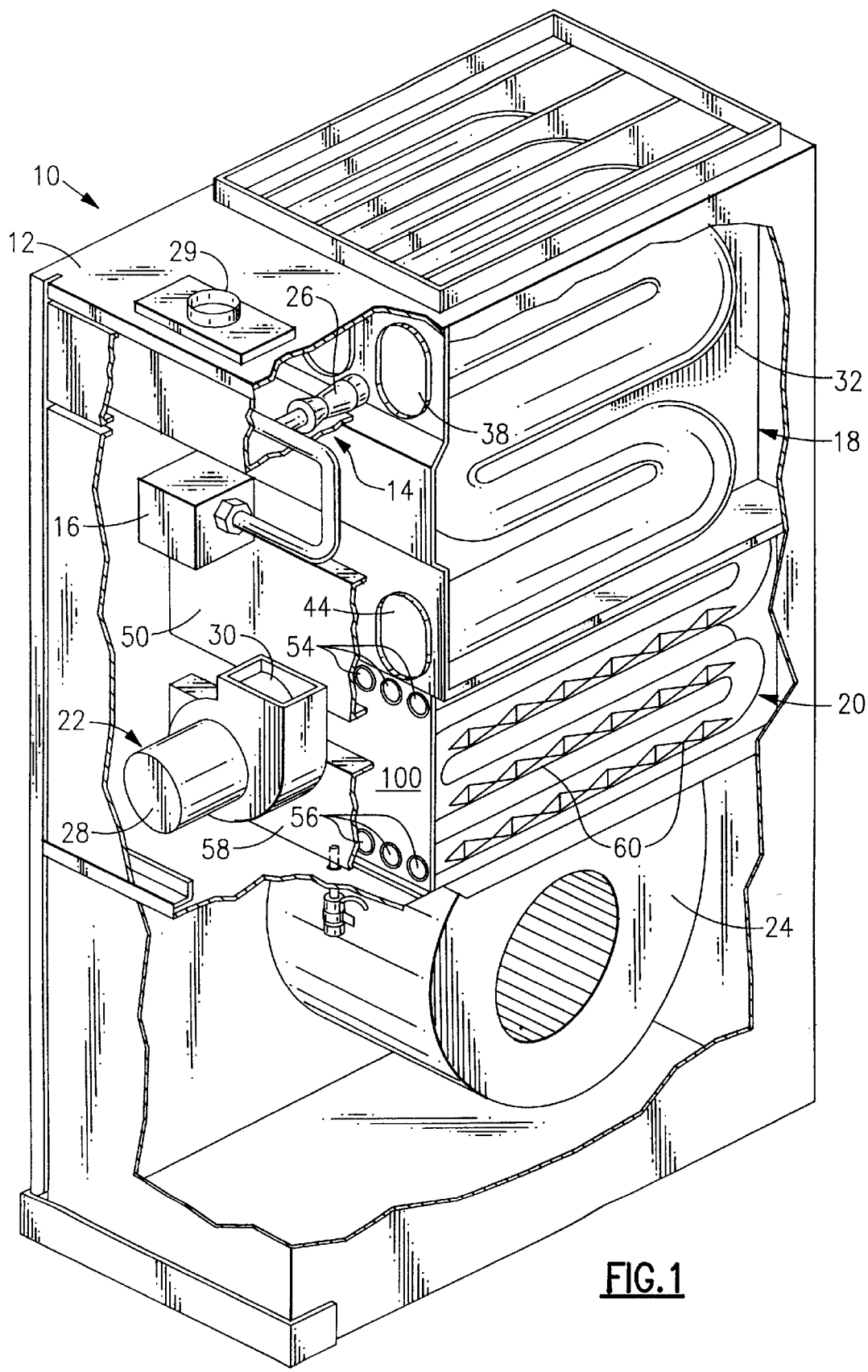
FIG. 1 is a perspective view, partly broken away, of a gas fired condensing furnace.

FIG. 1 illustrates a condensing furnace 10 which includes the improved secondary heat exchanger of the present invention. The furnace includes cabinet 12 housing therein burner assembly 14, gas control assembly 16, primary heat exchanger assembly 18, condensing heat exchanger assembly 20, induced draft motor assembly 22, and circulating air blower 24. The furnace includes a vertical arrangement of the above major assemblies, and particularly the heat exchanger assembly 18 and circulating air blower 24 in order to produce condensation in the condensing heat exchanger assembly 20.

Burner assembly 14 includes a plurality of inshot burners 26, one for each respective primary heat exchanger cell 32. Burners 26 receive fuel gas from gas control assembly 16 and inject the fuel gas into respective primary heat exchanger inlets 38. A part of the injection process includes drawing air through combustion air inlet 29 into primary heat exchanger assembly 18 so that the fuel gas and air mixture may be combusted therein. It should be understood that the number of primary heat exchanger cells and corresponding burners is established by the required heating capacity of the furnace.

Each primary heat exchanger cell 32 has a serpentine flow path which connects the primary heat exchanger inlets 38 in fluid communication to respective primary heat exchanger outlets 44. As the combustion gas exits the primary heat exchanger outlet 44 it flows into coupling box 50. Also connected to coupling box 50 and in fluid communication therewith is an improved condensing heat exchanger assembly 20 of the present invention which includes a plurality of interconnected condensing heat exchanger tubes 60 in the form of a roll-formed tube bank.

Each secondary or condensing heat exchanger includes a plurality of interconnected tubes, which include heat exchanger inlets 54 opening into coupling box 50 and a plurality of condensing heat exchanger outlets 56 opening into condensate collector 58 through apertures in mounting panel 100. Condenser heat exchanger outlets 56 deliver heating fluid exhaust or flue gases and condensate to condensate collector 58. As can be seen, FIG. 1, the secondary heat exchanger has an internal fluid flow through tubes 60 which wind downwardly from coupling box 50 in a serpentine manner. Further, there are a predetermined number of tubes 60 for each primary heat exchanger cell 32.

Induced draft motor assembly 22 includes a motor 28 with an inducer wheel 30 for drawing the heating fluid created by burner assembly 14 through primary heat exchanger assembly 18, coupling box 50, and condensing heat exchanger assembly 20, thereafter exhausting to a flue duct (not shown).

Figure 2:
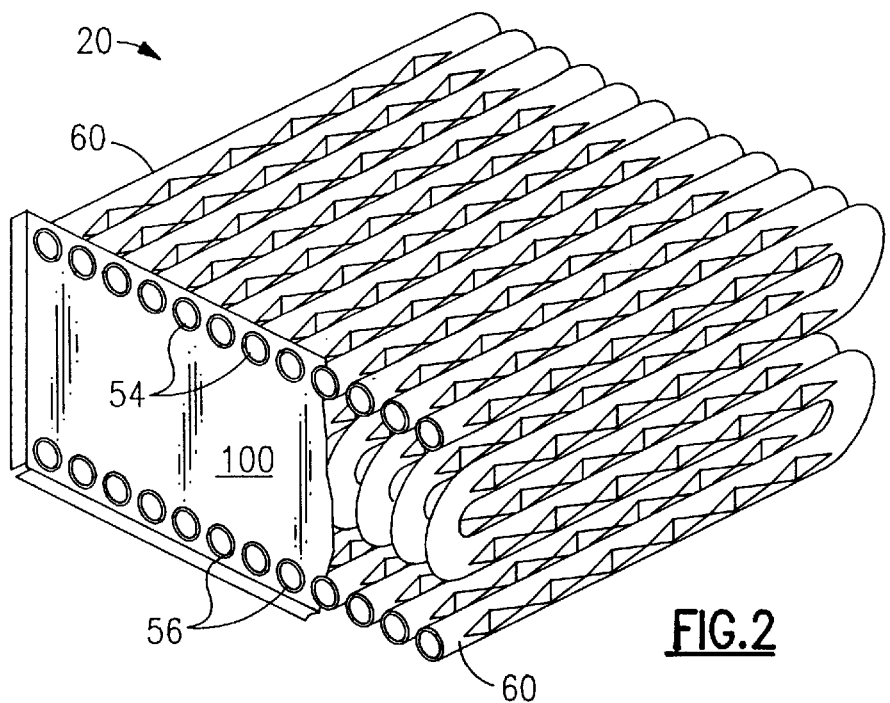
FIG. 2 is a perspective view, partly broken away, of the secondary heat exchanger illustrated in FIG. 1.

A more complete view of the secondary heat exchanger 20 of the present invention is illustrated in FIG. 2 which shows the complete device removed from the furnace.

Figure 3:
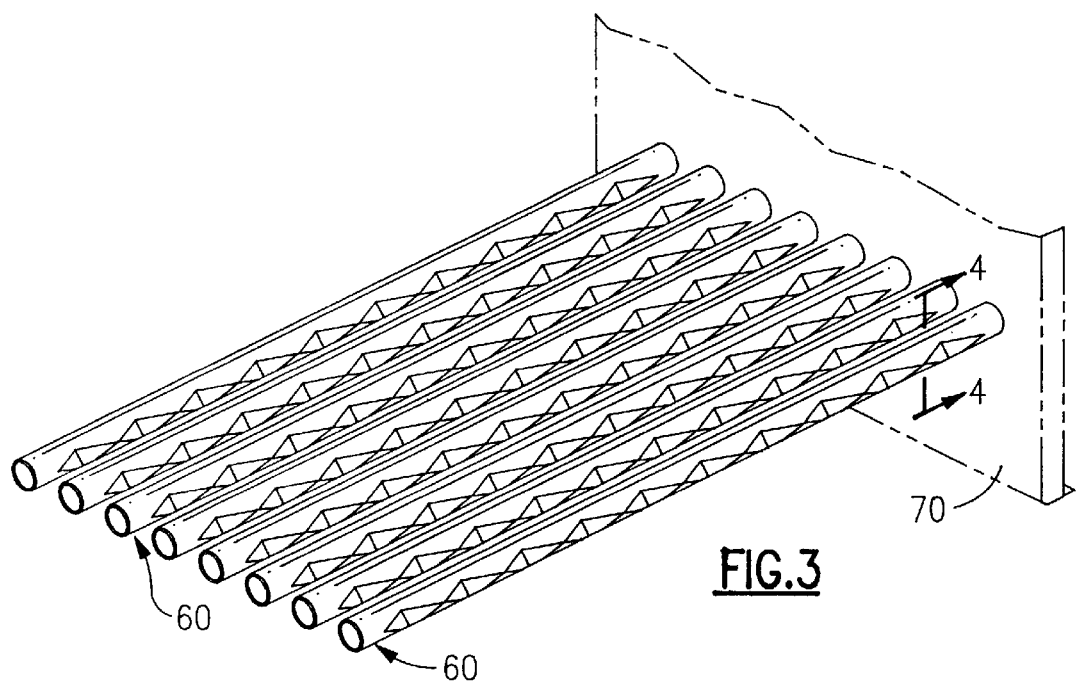
FIG. 3 illustrates a section of a secondary heat exchanger in the form of a roll-formed tube bank.

For a more fuller understanding of the present invention, reference is made to FIG. 3 of the drawings in which a partial section of the secondary heat exchanger bank of the present invention is presented in the form of a roll-formed tube bank. The tubes 60 are made of metal and are positioned in a header section 70. The tubes 60 are preferably fitted into the header plate or mounting panel by expansion or roll-locking by expanding the tube end until it forms a compression fit in a hole in the header plate. This expanded joint and compression fit is illustrated by the expanded tube end 61 in FIG. 11.

Figure 4:
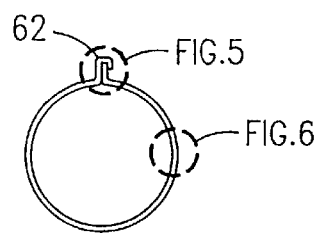
FIG. 4 is a cross-sectional view through a single tube taken along line 4—4 of FIG. 3.
Figure 5:
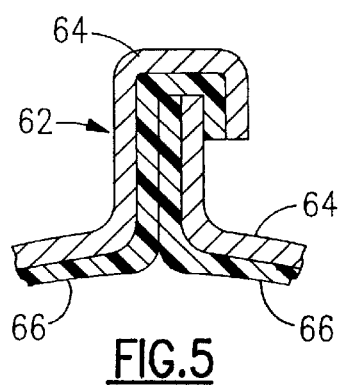
FIG. 5 is an enlarged view of the tube seam defined by the circle in FIG. 4.
Figure 6:
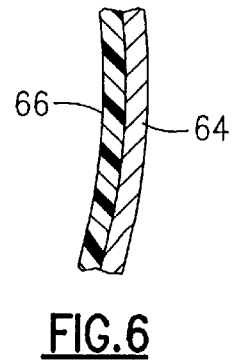
FIG. 6 is an enlarged view of a section of the wall thickness defined by the circle in FIG. 4.

As more fully illustrated in FIGS. 4–6, the tube 60 includes a longitudinal crimped seam 62 shown more clearly in enlarged sectional view of FIG. 5, and a cross sectional wall structure comprising a metal tube wall 64, and an adhesively adhering corrosion resistant polymer layer 66 uniformly covering the inner wall surface of the tube.(seams are not shown in FIGS. 1–3). The tubes used in the present invention are manufactured by a cold roll-forming process, and include a longitudinal seam which utilizes the compression of the polymer coating 66 as illustrated in FIG. 5. This seal is capable of maintaining its integrity at the required design pressures when used in a heat exchanger in a condensing furnace.

More specifically, the tubes are made from a laminated material which comprises a sheet metal, such as a low carbon steel, having one side thereof containing an adhesively bonded corrosion resistant polymer laminated sheet stock. A conventional roll-forming process is used to form the tubes used in the present invention. The process starts with rolls or coils of laminated material being cut to a desired width. The material then is roll-formed into a tube. The tubing cross section can be circular, oval, square, or rectangular and of any required dimension. The cold rollforming process is described in greater detail in the article "Cold Rolling of Steel" by William L. Roberts; published by Marcel Dekker, Inc., 1978; pages 771–772; Section 12–29 "Cold Roll Forming" which is incorporated herein by reference. The initially formed tube must then be sealed to form a single longitudinal seam. This is preferably done by crimping. The crimping results in two polymer surfaces being compressed together to form a seal capable of maintaining its integrity at the required design pressures. The sealed tube is then cut to the desired length.

Figure 7:
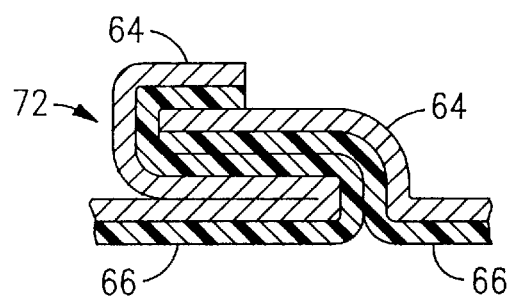
FIG. 7 is a second embodiment of a tube seam suitable for use in the present invention.
Figure 8:
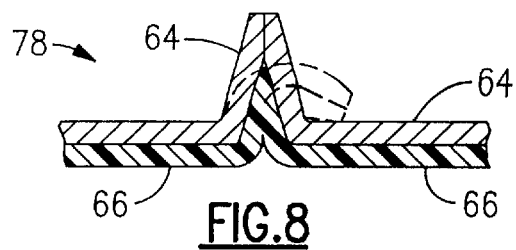
FIG. 8 illustrates a weld and fold seam which is suitable for use in the present invention.

FIG. 7 illustrate an alternative embodiment of a crimped seam 72 which can also be used in the present invention. The seam can also be welded and folded flat as illustrated by seam 78 in FIG. 8 in which the folded section is shown in phantom.

Figure 9:
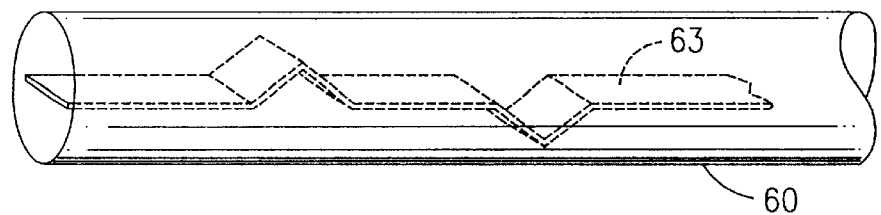
FIG. 9 illustrates a tube which contains an internal baffle.
Figure 10:
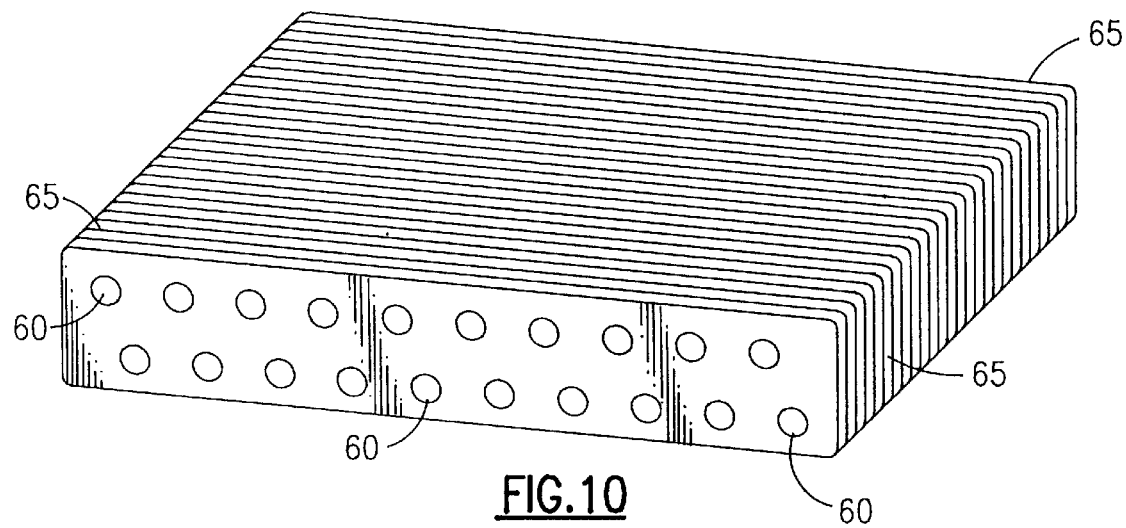
FIG. 10 illustrates a tube bank which contains an array of outer plate fins.

The heat exchanger is then made by conventional methods. FIG. 3 illustrates a single row tube bank with dimpled tubes. Other heat exchanger options include multiple staggered rows, the use of non-dimpled tubes with plate fins, or the use of internal baffles. FIG. 9 illustrates a tube with an internal baffle plate 63 to enhance the heat transfer rate from the flue gas. FIG. 10 illustrates the use of plate fins 65 to increase the heat transfer surface area. The use of U, S, and W tubes, or basically any commonly used heat exchanger configuration are also included within the scope of this invention.

Figure 11:
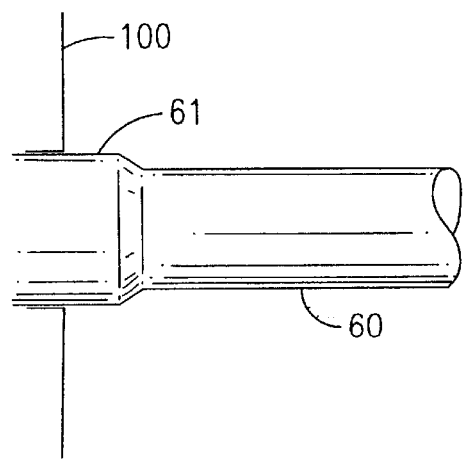
FIG. 11 illustrates the expanded joint used to fit the tubes into a header plate.

The headering of the tube ends can be accomplished by conventional expansion techniques. In this process the tube ends are inserted into a header that has an extruded hole slightly bigger than the tube diameter. The tube is then expanded until it forms a compression fit with the header plate as shown in FIG. 11.

The heat exchanger of the present invention is corrosion resistant and of a simple tubular construction which is inexpensive and relatively easy to manufacture.

While the present invention has been particularly shown and described with reference to the preferred mode as illustrated in the drawing, it will be understood by one skilled in the art that various changes in detail may be effected therein without departing from the spirit and scope of the invention as defined by the claims.

What is claimed:

1. A secondary heat exchanger suitable for use in a condensing furnace in the form of a bank of a plurality of cylindrical metal tubes which are positioned in a plurality of stacked rows with said tubes being interconnected to form a continuous fluid flow path, wherein each individual continuous tube is bent to the desired configuration to form a multiple or single pass, said tubes being made of metal and having a uniform adherent corrosion resistant polymeric internal surface, with said tubes further containing a longitudinal seam which has been formed by crimping the longitudinal edges of the tube together which provides for the compression of two polymer surfaces together to form a seal capable of maintaining its integrity at conventional design pressures.

2. The heat exchanger of claim 1 in which the tube is made of a low carbon steel.

3. The heat exchanger of claim 1 in which the corrosion resistant polymer comprises polypropylene.

4. The heat exchanger of claim 1 in which the longitudinal seam is made by folding one of the tube edges over the other tube edge to provide internal polymer to polymer contact in the internal seam area.

5. A gas fired condensing furnace which includes interconnected primary and secondary heat exchangers with said secondary heat exchanger having a tubular construction, the improvement comprising cylindrical tubes being arranged in the form of an array of stacked rows of a predetermined design with said rows of tubes being interconnected to form a continuous flow path, wherein each individual continuous tube is bent to the desired configuration to form a multiple or single pass, said tubes being made of metal and having a uniform adherent corrosion resistant polymeric internal surface, said tube further containing a longitudinal seam which has been formed by crimping the longitudinal edges of the tube together which provides for the compression of two polymer surfaces together to form a seal capable of maintaining its integrity at conventional design pressures.

6. The secondary heat exchanger of claim 5 in which the tube is made of steel, and the polymeric material comprises polypropylene.

* * * * *